3,679,433
PROTEIN-ENRICHED BAKED PRODUCTS AND METHOD OF MAKING SAME
Yeshajahu Pomeranz, Madison, Wis., and Karl F. Finney, Manhattan, Kans., assignors to the United States of America as represented by the Secretary of Agriculture
No Drawing. Filed Sept. 8, 1970, Ser. No. 70,490
Int. Cl. A21d *13/06, 2/26, 2/16*
U.S. Cl. 99—90 HP    5 Claims

ABSTRACT OF THE DISCLOSURE

Nutritionally improved baked products of consumer acceptance quality are produced by adding small amounts of naturally occurring or synthetic glycolipids to dough formulations containing added protein concentrates from plant or animal sources.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to the production of protein-enriched breads and other related baked products of the yeast-leavened type. More specifically, it relates to protein-enriched baked products having improved properties.

Increasing the protein content of food products has become an important priority of the food industry because of the inadequate levels of dietary protein throughout the world and because of consumer desire for high-protein low-caloric foods. Food products already familiar and acceptable to the public are especially good to use for protein enrichment.

Probably the most familiar are the yeast-leavened baked products (e.g., bread, rolls, buns, sweet rolls, and coffee cakes) which can be found everywhere in one form or another.

Many protein concentrates such as oilseed flours, isolated oilseed proteins, nonfat dry milk (NFDM), and fish flours have been used to supplement the natural wheat proteins in baked products. However, most of these have been found to have a deleterious effect on the quality of dough, to impair crumb color, and to decrease loaf volumes. Most of the effort to improve baking quality of protein-enriched products has concentrated on the use of soy flour supplements because of their availability and low cost.

Adding up to 1 percent soy flour to dough formulations can reduce oxidation requirements and improve the overall qualities of bread. Higher quantities of raw flour have an adverse effect on breadmaking and organoleptic qualities. Pollock and Geddes, Cereal Chem. 37: 30 (1960), showed that heat treating soy flour to overcome the flavor problem decreased the quality of soy flour-enriched bread. Finney et al., Cereal Sci. Today 8: 166–168, 183 (1963), determined that employing optimum potassium bromate levels helps to overcome some of the deleterious effects of heat-treated soy flour. They also found that using toasted soy grits rather than the finely powdered flour gave more appetizing breads.

Jansen and Ehle, Food Technol. 19(9): 129–136 (1965), showed that adding 10.8 percent toasted soy flour substantially harmed organoleptic properties and loaf volume of bread but that replacing 3 to 4 percent of the soy flour with wheat gluten reduced some of the bad effects. Isolated soy protein can be added up to about 5 percent along with about 5 percent wheat gluten without substantial loss of loaf volume. Mizrahi et al., Cereal Chem. 44: 193 (1967), added up to 4 percent isolated soy protein having 76 to 79 percent protein to bread with little impairment of loaf volume as long as a small amount of lecithin was used. Bread containing 4 percent isolated protein plus 1 percent lecithin had loaf volumes that were 92 to 94 percent of the volume of control loaves without added protein or lecithin. Adler and Pomeranz, J. Sci. Food Agr. 10: 449 (1959), also reported that lecithinated soy flours improved the quality of bread made with a lean dough formula.

In spite of the efforts to overcome the detrimental effects, the amounts of protein supplements in baked products remains relatively low. Only about one-fourth of total edible soy flour and meal produced in the United States is used in yeast-leavened baked products, and the level of supplement added to dough formulations is not usually over about 3 to 4 percent.

The object of this invention is the provision of a method of producing baked products containing greatly increased levels of protein from inexpensive and available sources.

A more specific object of the invention is to provide a method of increasing the protein level of baked products without impairing the breadmaking properties of the dough or the quality of the product. The added proteins must become compatible with wheat flour protein with no more than minor adjustments in formula.

In accordance with the invention a method of making an improved bread from wheat flour has been discovered. In the normal method of making bread of the yeast-leavened type, the dough is formulated, mixed, fermented, kneaded, shaped, and baked. Our improvement comprises the addition of glycolipids and protein concentrates to the dough formulation. When protein concentrates of from 4 to 16 parts per 100 parts of wheat flour are added to the formulation, glycolipids are added in amounts of from 0.25 to 6 parts per 100 parts of wheat flour.

DETAILED DESCRIPTION OF THE INVENTION

The basic method for baking yeast-leavened products used to illustrate the instant invention was for straight dough essentially as described in Approved Methods, vol. 1, American Association of Cereal Chemists, Inc., St. Paul, Minn., 1962. The basic method comprises a rich formula (i.e., one that includes such optional ingredients as shortening, sugar, and malt). Protein concentrates replaced nonfat dry milk and natural or synthetic glycolipids replaced shortening in the standard formulation to make breads that had greatly increased nutritional value without decreasing any of the overall quality of baked products as evaluated by loaf volume, crumb grain, and texture. The protein concentrates and glycolipids were added to the formulations before mixing, but they may also be added to the flour at the processing plant before shipment to the bakeries.

Baked products of good quality were produced from dough formulations that contained as little as 0.25 part glycolipids and 4 parts protein concentrate per 100 parts wheat flour. In similar products containing 6 parts glycolipids and 16 parts protein concentrate per 100 parts wheat flour, the quality was exceptional.

Flours from several wheat varieties, such as soft winter and spring wheat, were found to give results comparable to the untreated Regional Baking Standard (RBS) wheat flour used in the examples. RBS flour is a representative composite of hard winter wheat from the Great Plains of the U.S.A. Any wheat flour normally used by the baking industry would be considered equivalent to those above for the purpose of the invention.

Protein concentrates used in the examples contained from 27 to 90 percent protein and included soy flour, isolated soy protein, sodium soy proteinate, defatted cottonseed flour, nonfat dry milk, air-fractionated wheat flour, defatted wheat germ, torula yeast, expeller-extracted sesame seed flour, fish protein concentrate, and wheat gluten. Each of these gave breads having acceptable loaf volume, crumb grain, and texture. Soy flour containing 50 percent protein is preferred because it is most available and inexpensive. Unlike previous studies with soy flours, finely ground protein concentrates are preferred for use in the instant method.

The natural glycolipids used in the examples were from two separate sources. Free-polar lipids rich in glycolipids were obtained by fractionating free lipids (petroleum ether-extracted) from RBS flour by silicic acid chromatography and by exhaustive extraction of *Briza spicata* seeds with petroleum ether. Synthetic glycolipids (sucroesters) were obtained commercially and included sucrose monolaurate, sucrose dilaurate, sucrose monopalmitate, sucrose dipalmitate, sucrose monostearate, sucrose distearate, sucrose tristearate, sucrose sesquilaurate, sucrose sesquistearate, and sucrose tallowate.

All of the glycolipids listed above gave improved baked products when compared to similar products containing no lipids. However, free-polar wheat flour lipids and the synthetic glycolipids with fewer and shorter chainlengths of fatty acids attached to the sucrose molecule are preferred because they show the greatest improving effect.

Sucroesters generally increase loaf volume of baked products without protein concentrates to the same degree as vegetable shortening, but in protein-enriched baked products the improving effect of sucroesters with short-chain fatty acids and of free-polar wheat lipids was generally greater than that of vegetable shortening. This seems to indicate that with nonenriched baked products the effect is related to physical rather than chemical properties of lipids, but when protein concentrates are present, it seems that the chemical properties of the glycolipids interact with the protein to make it functional and compatible with wheat proteins in the production of bread and related products.

With the method described above, baked products may be enriched to high levels with protein concentrates from many sources to give products of equal or superior quality to those with no enrichment. Acceptable high-protein products may be made with lean formulations by the instant method in areas where shortening, sugar, and malt are in short supply. The method also provides a way of controlling protein enrichment in yeast-leavened baked products.

Example 1

Bread was made essentially by the AACC standard straight dough method using untreated Regional Baking Standard wheat flour. The dough formulation consisted of:

Wheat flour (12.9% protein)—100 g.
Salt—1.5 g.
Yeast—2 g.
Nonfat dry milk (NFDM)—4 g.
Sucrose—6 g.
60° L. malt syrup—0.5 g.
Shortening (vegetable)—3 g.
Water—as needed
Potassium bromate—optimum (see Finney, K. F., Cereal Chem. 23; 96–104 (1946) and Finney et al., Cereal Sci. Today 8: 166–168 (1963))

The above formula was mixed and allowed to ferment for 3 hours at 30° C. Kneading and shaping were performed mechanically. The bread was then baked at 218° C. for 24 minutes. Table 1 shows the results of a number of loaves baked as above except that the amount of shortening in the dough formulation was varied from 0 to 9 g. In some of the formulations the shortening was replaced by from 0.25 to 6 g. of sucrose tallowate, and the NFDM was replaced by from 4 to 32 g. of several soy flours containing about 50 percent protein. Loaf volume, crumb grain, and crumb compressibility were used as the criterion of comparison. Loaf volumes were determined by dwarf rapeseed displacement immediately after the bread was taken from the oven. After cooling, the loaves were cut and their crumb grains and textures evaluated. A code of S=satisfactory, Q=questionable, and U=unsatisfactory was employed. Soy flour-enriched loaves of bread containing the synthetic glycolipid, sucrose tallowate, had as good or better loaf volume, crumb grain, and texture as loaves made with the standard formulation and were considerably better than loaves with no lipids.

TABLE 1

| Soy flour, g. | Lipids, g. | | Loaf volume, cc. | Crumb grain |
|---|---|---|---|---|
| | Shortening | Sucrose tallowate | | |
| 0 | 0 | 0 | 860 | Q-S |
| 0 | 1 | 0 | 890 | S |
| 0 | 2 | 0 | 900 | S |
| 0 | 3 | 0 | 893 | S |
| 4 | 1 | 0 | 883 | Q-S |
| 4 | 3 | 0 | 898 | Q-S |
| 8 | 1 | 0 | 878 | Q-U |
| 8 | 3 | 0 | 918 | Q-S |
| 16 | 3 | 0 | 900 | S |
| 16 | 6 | 0 | 885 | Q-S |
| 16 | 9 | 0 | 887 | Q-S |
| 32 | 6 | 0 | 505 | U |
| 0 | 0 | 0.25 | 893 | S |
| 0 | 0 | 0.50 | 900 | S |
| 4 | 0 | 0.25 | 915 | Q-S |
| 4 | 0 | 0.50 | 918 | Q-S |
| 8 | 0 | 0.25 | 878 | Q-U |
| 8 | 0 | 0.50 | 945 | Q-S |
| 16 | 0 | 1 | 875 | Q |
| 16 | 0 | 2 | 938 | Q |
| 16 | 0 | 3 | 993 | S |
| 16 | 0 | 4 | 1,030 | S |
| 16 | 0 | 6 | 1,100 | S |
| 32 | 0 | 2 | 607 | U |
| 4 | 0 | 0 | 820 | U |
| 8 | 0 | 0 | 717 | U |
| 16 | 0 | 0 | 675 | U |
| 16 | 0 | 0 | 700 | U |
| 32 | 0 | 0 | 505 | U |

Crumb compressibility was measured with a compressometer. The plunger, 25 mm. in diameter, was depressed 4 mm. into the bread crumb after the crust was removed. The weight required to depress the plunger was taken as the compressibility parameter. Compressibility was measured on bread crumbs from wrapped and sealed loaves that were stored at room temperature (about 25° C.) for 24 or 48 hours. Crumb softness in bread loaves enriched with soy flour and containing 0.5 percent synthetic glycolipids was equal to or better than bread baked with 3 percent commercial vegetable shortening.

Example 2

Vegetable protein-enriched breads were baked by the standard method described in Example 1. Eight grams of protein concentrates ranging from 27 to 90 percent protein were added to the dough formulation, which also contained either no lipids, 3 g. of shortening, 0.5 g. of natural glycolipids, or 0.5 g. of synthetic glycolipids. Sucrose monolaurate was added to NFDM, air-fractionated flour, and defatted wheat germ enriched formulation in the amount of 1 g. instead of 0.5 g. Table 2 shows that essentially all protein-enriched loaves containing synthetic and natural glycolipids are improved over the control loaves containing no lipids and those containing 3 g. of shortening.

TABLE 2

| Protein concentrate | Protein, percent | Loaf volume, cc. (crumb grain) | | | | | |
|---|---|---|---|---|---|---|---|
| | | No lipids | Shortening | Sucrose tallowate | Sucrose monolaurate | Free-polar lipids | |
| | | | | | | B. spicata | Wheat |
| Soy flour | 50 | 717 (U) | 918 (Q-S) | 945 (Q-S) | | | |
| Do | 52 | 755 (Q) | 870 (S) | 915 (S) | | 883 (S) | |
| Do | 70 | 680 (Q-U) | 735 (Q-U) | 813 (Q) | | | |
| Isolated soy protein | 90 | 673 (Q-U) | 798 (Q) | 885 (Q-S) | | | |
| Sodium soy proteinate | 85 | 618 (Q-U) | 805 (Q-S) | 835 (Q-S) | | | |
| Defatted cottonseed flour | 63 | 733 (Q-U) | 835 (Q-U) | 850 (S) | | 833 (S) | 900 (S) |
| Nonfat dry milk | 35 | 870 | 950 | | 940 | | |
| Air-fract. wheat flour | 27 | 870 | 945 | | 990 | | |
| Defatted wheat germ | 30 | 688 | 853 | | 815 | | |
| Torula yeast | 55 | 773 (Q-S) | 803 (S) | 850 (S) | | | |
| Sesame seed flour | 46 | 678 (U) | 775 (Q) | 848 (Q) | | | |
| Fish protein concentrate | 70 | 710 (U) | 843 (Q) | 860 (Q) | | | |
| Wheat gluten | 75 | 805 (Q) | 845 (Q) | 990 (S) | | | |

Example 3

Samples of bread were prepared using the standard procedure described in Example 1. The dough formulations were also the same except that in most samples the shortening was replaced by a natural or a synthetic glycolipid. Some of the formulations were made without soy flour for comparative purposes, Table 3.

Breads enriched with 8 g. of soy flour and containing 0.5 g. of either free-polar wheat flour lipids, sucrose monolaurate, sucrose monopalmitate, or sucrose monostearate were subjected to compressibility tests, and the results were compared to those from similarly enriched breads containing either shortening or no lipids. Softness was improved most by free-polar lipids. Crumbs of bread baked with 0.5 g. synthetic glycolipids were equal to or softer than those of bread baked with 3 g. of shortening. Bread baked with no lipids was the least soft.

TABLE 3

| Lipid | Lipid level, g. | Loaf volume, cc. | | | |
|---|---|---|---|---|---|
| | | Without soy flour | Crumb grain | With 8 g. soy flour | Crumb grain |
| None | None | 860 | Q-S | 766 | O-U |
| Shortening | 3.0 | 893 | S | 933 | Q-S |
| Free-polar: | | | | | |
| Wheat flour | 0.5 | 992 | S[1] | 1,015 | S |
| B. spicata | 0.5 | | | 883 | S |
| Sucrose: | | | | | |
| Monolaurate | 0.5 | 865 | S | 997 | Q-S |
| Sesquilaurate | 0.5 | | | 970 | Q-S |
| Dilaurate | 0.5 | | | 955 | Q-S |
| Monopalmitate | 0.5 | 905 | S | 965 | Q-S |
| Dipalmitate | 0.5 | | | 840 | Q |
| Monostearate | 0.5 | 895 | S | 915 | Q-S |
| Sesquistearate | 0.5 | | | 853 | Q |
| Tristearate | 0.5 | | | 795 | Q |
| Tallowate | 0.5 | 900 | S | 945 | Q-S |

[1] Open.

We claim:

1. In the method of making baked products of the yeast-leavened type from wheat flour wherein a dough formulation is mixed, fermented, kneaded, shaped, and baked; the improvement comprising the addition to said dough formulation of protein concentrates in sufficient quantities to effectively increase protein levels in said dough formulation and the addition of sufficient glycolipids to maintain acceptable breadmaking properties of said dough formulation.

2. A method of making baked products as described in claim 1 in which the glycolipids comprise from 0.25 to 6 parts per 100 parts of wheat flour, and the protein concentrates comprise from 4 to 16 parts per 100 parts of wheat flour.

3. A method of making baked products as described in claim 1 in which the protein concentrates are selected from the group consisting of soy flour, isolated soy protein, sodium soy proteinate, defatted cottonseed flour, nonfat dry milk, air-fractionated wheat flour, defatted wheat germ, torula yeast, expeller-extracted sesame seed flour, fish protein concentrate, and wheat gluten.

4. A method of making baked products as described in claim 1 in which the glycolipid is selected from the group consisting of free-polar wheat flour lipids, free-polar lipids from Briza spicata seeds, sucrose monolaurate, sucrose dilaurate, sucrose monopalmitate, sucrose dipalmitate, sucrose monostearate, sucrose distearate, sucrose tristearate, sucrose sesquilaurate, sucrose sesquistearate, and sucrose tallowate.

5. Yeast-leavened baked products from wheat flour containing from about 0.25 to 6 parts of glycolipids and 4 to 16 parts of protein concentrates per 100 parts wheat flour.

References Cited

UNITED STATES PATENTS 2,893,990   7/1959   Hass et al. _____ 99—91 UX

OTHER REFERENCES

Pomeranz: "Soy Flour in Breadmaking," The Baker's Digest, vol. 40, No. 3, pp. 44–48, 78 (June 1966).

A. LOUIS MONACELL, Primary Examiner

J. R. HOFFMAN, Assistant Examiner

U.S. Cl. X.R.

99—91, 93